(12) United States Patent
Galway

(10) Patent No.: US 7,566,036 B1
(45) Date of Patent: Jul. 28, 2009

(54) APPARATUS FOR SECURELY MOUNTING A LISTENING DEVICE WITHIN A VEHICLE

(76) Inventor: Ronald D. Galway, 520 Park Ave., Union City, IN (US) 47390

( * ) Notice: Subject to any disclaimer, the term of this patent is extended or adjusted under 35 U.S.C. 154(b) by 853 days.

(21) Appl. No.: 11/159,673

(22) Filed: Jun. 23, 2005

(51) Int. Cl.
*A47B 96/06* (2006.01)
*A47B 29/00* (2006.01)
*A47G 29/00* (2006.01)
*A47K 1/00* (2006.01)

(52) U.S. Cl. .................. 248/218.4; 248/214; 224/275; 224/929

(58) Field of Classification Search .............. 248/215, 248/218.4, 301, 89; 224/2.75, 929
See application file for complete search history.

(56) References Cited

U.S. PATENT DOCUMENTS

| | | | | |
|---|---|---|---|---|
| 3,638,890 A | * | 2/1972 | Burrell et al. | 248/215 |
| D288,284 S | * | 2/1987 | Courtemanche et al. | D8/373 |
| 4,805,782 A | * | 2/1989 | Hale et al. | 211/30 |
| D377,866 S | * | 2/1997 | Samples | D3/328 |
| 5,791,614 A | | 8/1998 | Sims | |
| 6,364,260 B1 | * | 4/2002 | Lorincz et al. | 248/215 |
| 2003/0121943 A1 | * | 7/2003 | Chou | 224/275 |
| 2006/0138290 A1 | * | 6/2006 | Vitito | 248/205.2 |

* cited by examiner

Primary Examiner—Amy J. Sterling

(57) ABSTRACT

An apparatus for securely mounting a listening device within a vehicle. The apparatus comprises two separate pieces of plastic that are attached to one another, with one of the pieces of plastic designed to be attached to a post supporting an automobile headrest and the other piece of plastic designed for placement of a listening device. The listening device most ideally used is a pair of headphones.

4 Claims, 4 Drawing Sheets

APPARATUS FOR SECURELY MOUNTING A LISTENING DEVICE WITHIN A VEHICLE

BACKGROUND OF THE INVENTION

The present invention concerns that of a new and improved apparatus for securely mounting a listening device within a vehicle. This invention relates generally to a novel support adapted for use in connection with a headset or the like, and is particularly directed to novel easily mountable brackets, supports and hangers adapted to keep headphones from being damaged or misplaced during storage.

Headphones are used for a variety of reasons within a vehicle to listen to sound that may stem from a radio, television set, telephone, or stereo equipment, etc. Almost every new vehicle manufactured today contains some if not all the abovementioned electronic entertainment devices. Further, there are options for individual users to listen to and view personally selected programming independent of the other passengers.

This creates a situation where many personal listening devices such as headphones or headsets are used and stored within a vehicle.

Headphones or headsets are generally designed to be as light as possible in order to be comfortable to wear by the user. Towards this end the headband portion is curved to conform to the contour of the user's head with one or two ear microphones connected to the headband for covering the ear's of the user. Due to the inherent design configuration of the headset one is left with an item of an odd shape that is difficult to store when not in use. Furthermore, to keep the weight of the headset as low as possible for comfort reasons, results in the fact that it can readily be bent out of shape unless proper storage of the headset is provided for. The storage of the headset is further complicated by the fact that a coiled or regular connecting cord is connected thereto. The cord which may extend for several feet, may weigh more than the headphones and has a tendency to pull the headphones from its stored position unless the headset is firmly held in position.

DESCRIPTION OF THE PRIOR ART

U.S. Pat. No. 4,036,464, issued to Olson, discloses a headset hanger that may be mounted near stereo equipment in homes, studios, or other related areas to keep headphones from being damaged or misplaced.

U.S. Pat. No. 5,791,614, issued to Sims, discloses a head rest mounted hanger comprising a plurality of hanging means connected to a hanger body and post grooves for engagement with the head rest posts of a seat head rest.

U.S. Pat. No. 6,439,443 B1, issued to Liao, discloses a car butler that acts as an articles hanger for use in a car.

U.S. Pat. No. 4,981,243, issued to Rogowski, discloses an audio equipment carrier assembly that is mounted on the handlebars or other like support members of various two and three wheel vehicles.

U.S. Pat. No. 6,216,927 B1, issued to Meritt, discloses a mounting device for releasably and securely mounting an entertainment accessory within an automobile having a headrest extending from a seat.

SUMMARY OF THE INVENTION

The present invention concerns that of a new and improved apparatus for securely mounting a listening device within a vehicle. The apparatus comprises two separate pieces of plastic that are attached to one another, with one of the pieces of plastic designed to be attached to a post supporting an automobile headrest and the other piece of plastic designed for placement of a listening device. The listening device most ideally used is a pair of headphones.

There has thus been outlined, rather broadly, the more important features of an apparatus for securely mounting a listening device within a vehicle that the detailed description thereof that follows may be better understood and in order that the present contribution to the art may be better appreciated. There are, of course, additional features of the apparatus for securely mounting a listening device within a vehicle that will be described hereinafter and which will form the subject matter of the claims appended hereto.

In this respect, before explaining at least one embodiment of the apparatus for securely mounting a listening device within a vehicle in detail, it is to be understood that the apparatus for securely mounting a listening device within a vehicle is not limited in its application to the details of construction and to the arrangements of the components set forth in the following description or illustrated in the drawings.

The apparatus for securely mounting a listening device within a vehicle is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus for securely mounting a listening device within a vehicle. It is important, therefore, that the claims be regarded as including such equivalent constructions insofar as they do not depart from the spirit and scope of the present invention.

It is therefore an object of the present invention to provide an apparatus for securely mounting a listening device within a vehicle which has all of the advantages of the prior art and none of the disadvantages.

It is another object of the present invention to provide an apparatus for securely mounting a listening device within a vehicle which may be easily and efficiently manufactured and marketed.

It is another object of the present invention to provide an apparatus for securely mounting a listening device within a vehicle which is of durable and reliable construction.

It is yet another object of the present invention to provide an apparatus for securely mounting a listening device within a vehicle which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
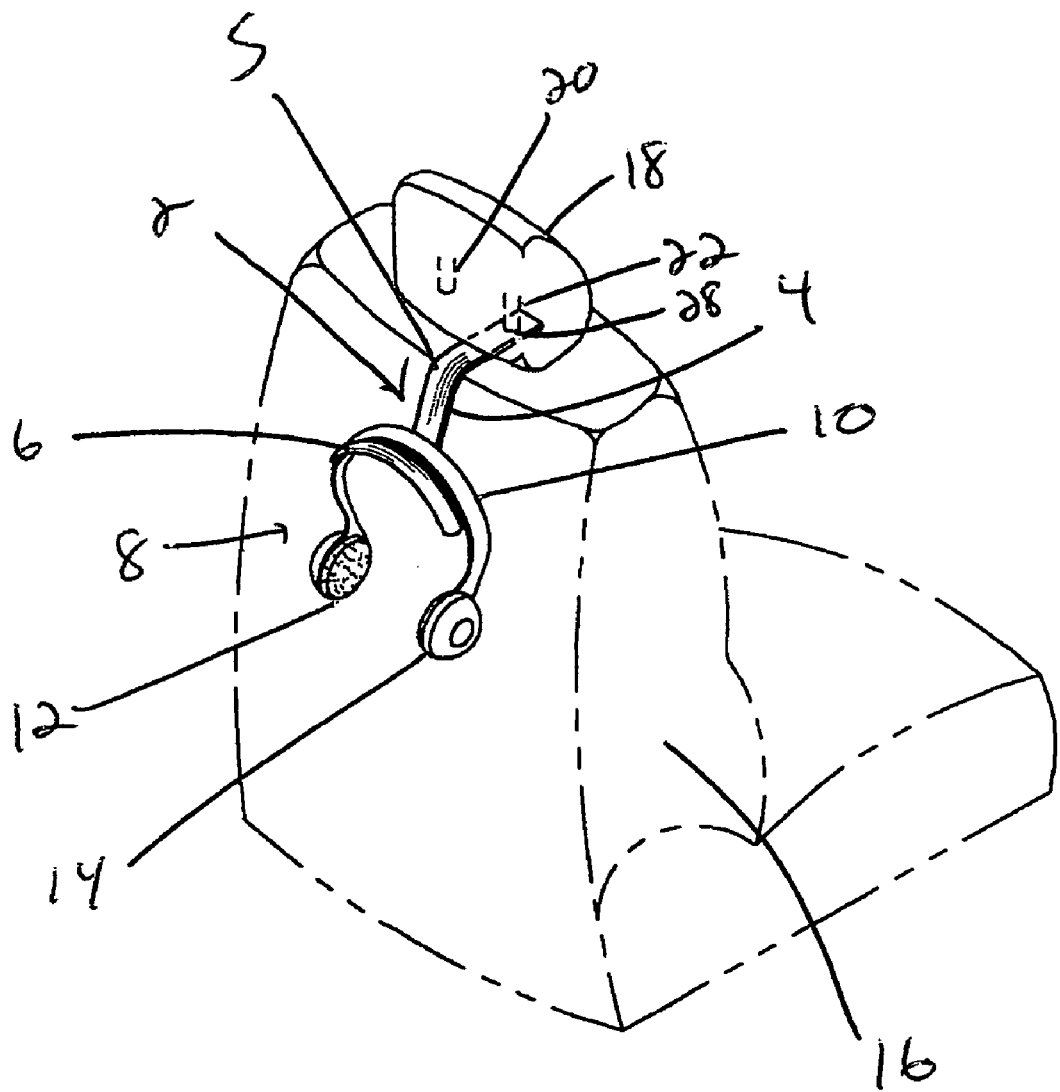
FIG. 1 shows a perspective view of the first embodiment of the present invention.
Figure 2:
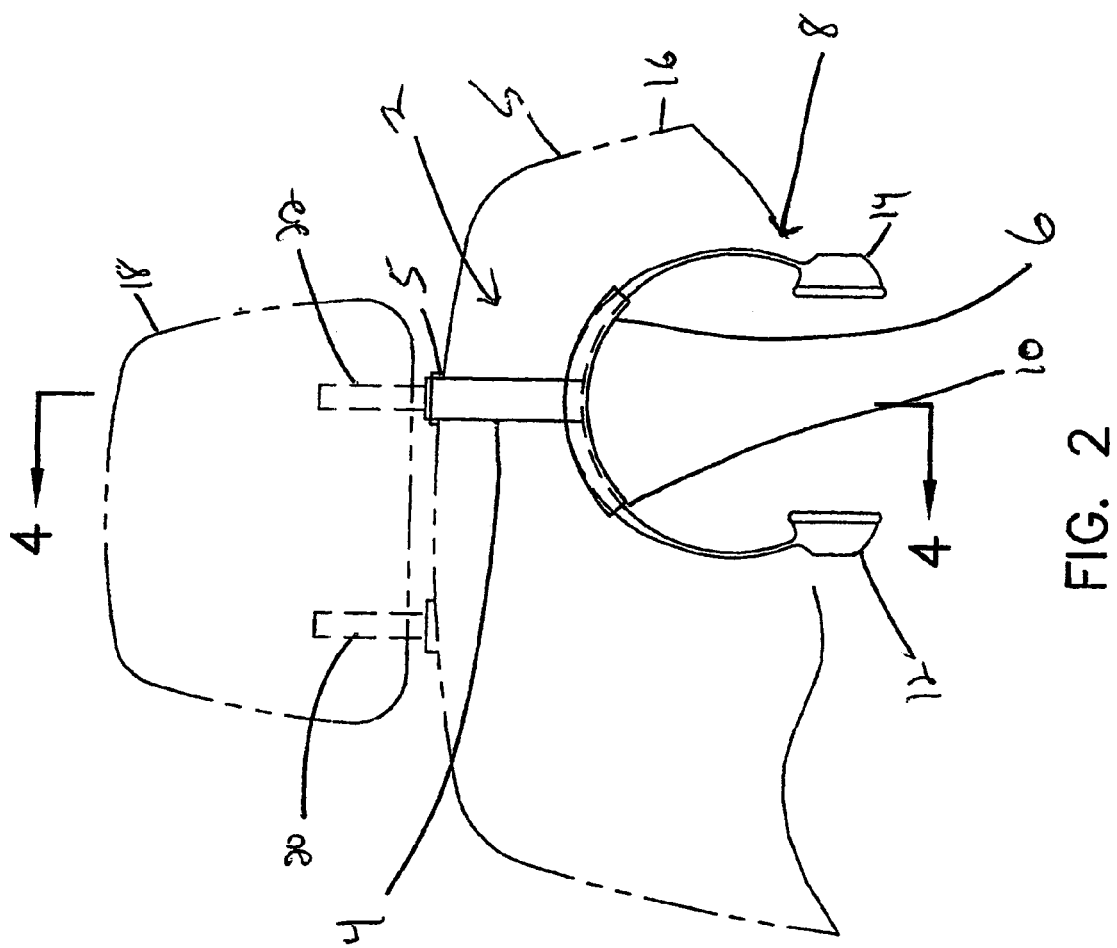
FIG. 2 shows a front view of the first embodiment of the present invention.
Figure 4:
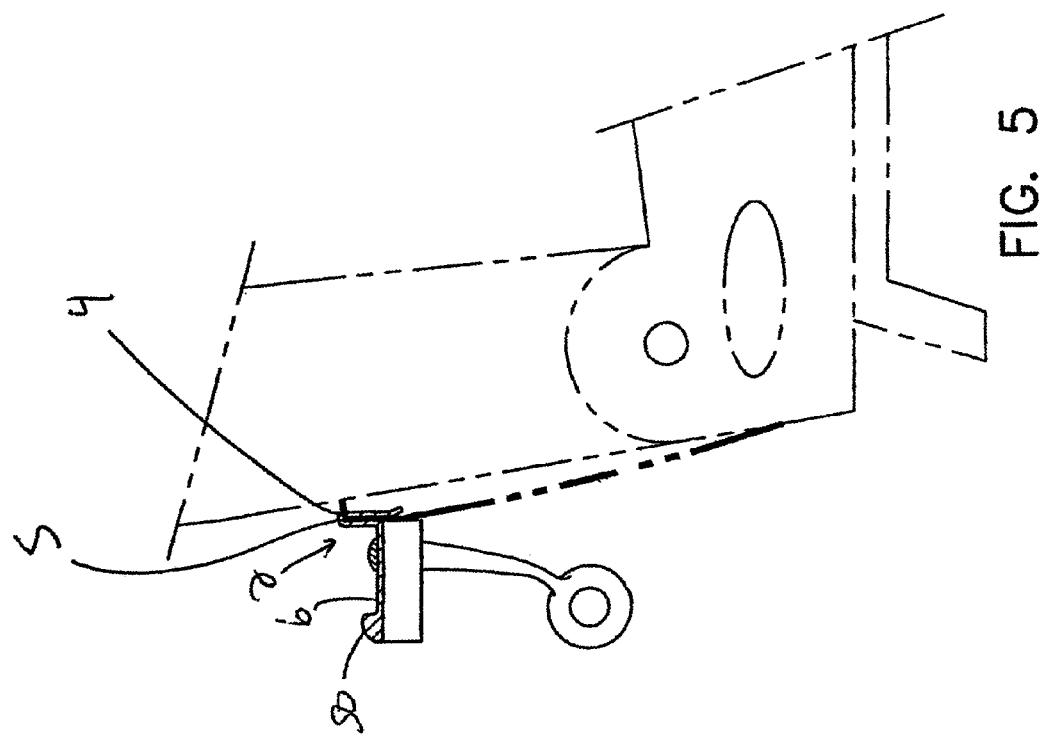
FIG. 4 shows a side view of the first embodiment of the present invention.

FIG. 1 shows a perspective view of the first embodiment of the present invention, while FIG. 2 shows a front view of the first embodiment of the present invention. Furthermore, FIG. 4 shows a side view of the first embodiment of the present invention.

Listening device holder 2 comprises two pieces comprising a first piece 4 and a second piece 6, which each piece having two ends, a first end and a second end, and each piece also comprising two sides, a first side and a second side. The first end of the first piece of plastic 4 has a small hole 28 located on it. The first piece 4 also has a bend 5 in between the first end and the second end of the first piece 4, with this bend 5 designed to have a particular angle of about eighty to ninety degrees.

The second piece 6 has a semi-circular shape from the first end of the second piece of the second piece 6, with the first side of the second piece 6 being concave in nature and the second side of the second piece 6 being convex. The second piece 6 also has two edges, a front edge and a rear edge, with the second side of the second piece 6 having a small ridge 50 attached to it near the front edge of the second piece 6. The second end of the first piece 4 is attached to the second piece 6 approximately halfway in between the first end and the second end of the second piece 6, with the second piece 6 having the second side of the second piece 6 being located upward and the first side of the second piece 6 being located downward.

The listening device holder 2 is designed to be attached to a vehicle seat 16. The vehicle seat 16 has two sides, a front side and a rear side, and furthermore, has a top end. Attached to the top end are a pair of posts 20 and 22, with the posts being vertically mounted. A headrest 18 is insertably attached onto the posts 20 and 22. The hole 28 on the first end of the first piece 4 is designed to be placed over post 22 before the headrest 18 is placed over the posts 20 and 22. As a result, the first piece 4 and the second piece 6 are designed to hang over on the rear side of the vehicle seat 16. The means for mounting the apparatus within the vehicle is a vehicle seat 16, the vehicle seat 16 having two sides, a front side and a rear side, the vehicle seat also having a top end, as well as a pair of posts 20, 22 attached to the top end of the vehicle seat, each of the posts 20, 22 being vertically mounted, a hole 28 located on the first end of the first piece 4, wherein the hole 28 is placed over one of the posts of the pair of posts 20, 22, a headrest 18 insertably attached to the posts 20, 22 after the first piece 4 has been attached to one of the posts, wherein the first piece 4 and the second piece 6 are designed to hang over on the rear side of the vehicle seat 16.

A pair of headphones 8 are placed over the second side of the second piece 6 of the listening device holder 2. The pair of headphones 8 comprises a central band 10 with two ends, a first end and a second end. The pair of headphones 8 also comprises a pair of earpieces 12 and 14, with the earpiece 12 being attached to the first end of the central band 10 and the earpiece 14 being attached to the second end of the central band 14. By mounting the pair of headphones 8 over the listening device holder 2, an individual may place the pair of headphones 8 (or any other type of listening device, for that matter) out of harm's way and in a safe and readily accessible location.

Figure 3:
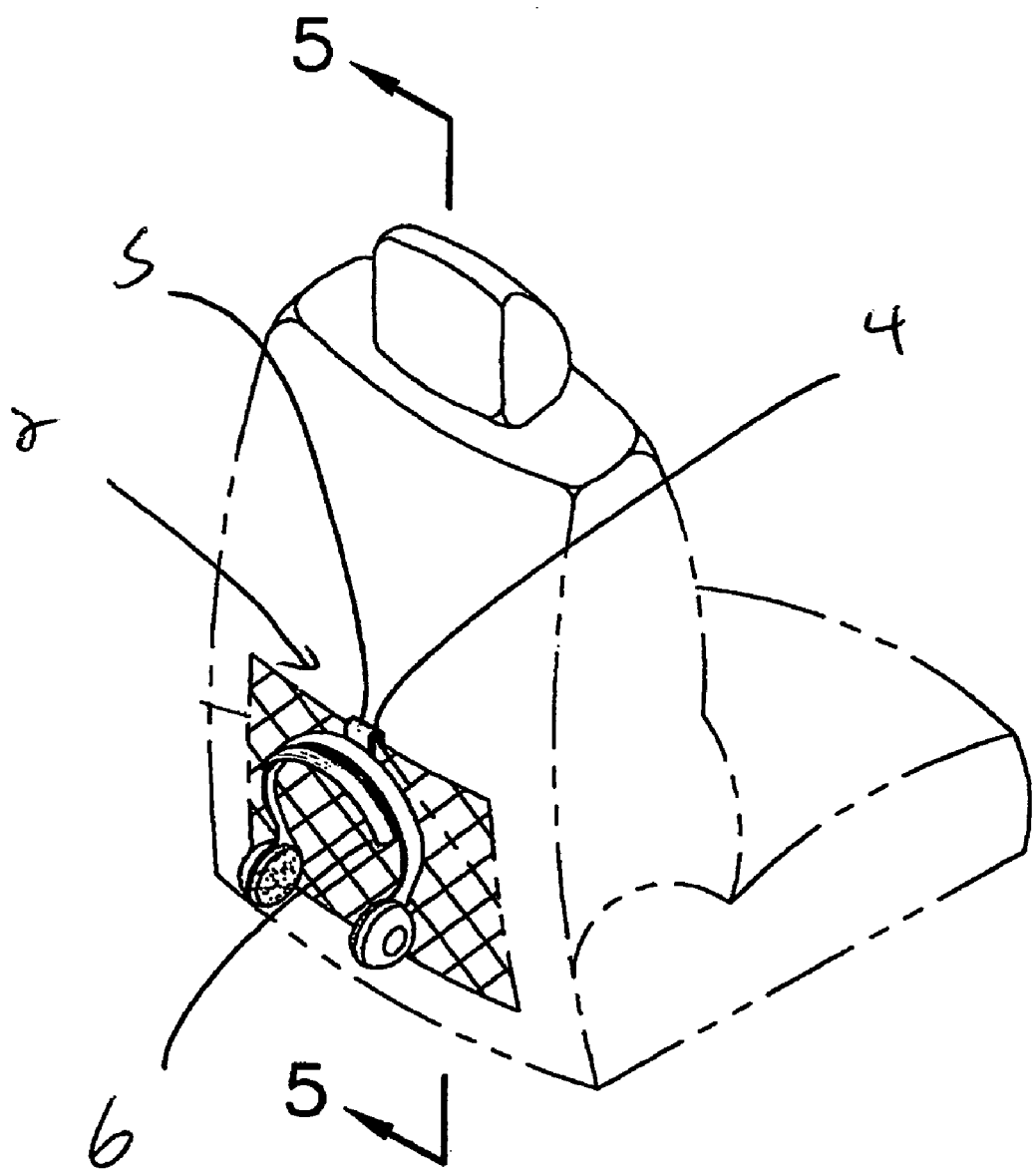
FIG. 3 shows a perspective view of the second embodiment of the present invention.
Figure 5:
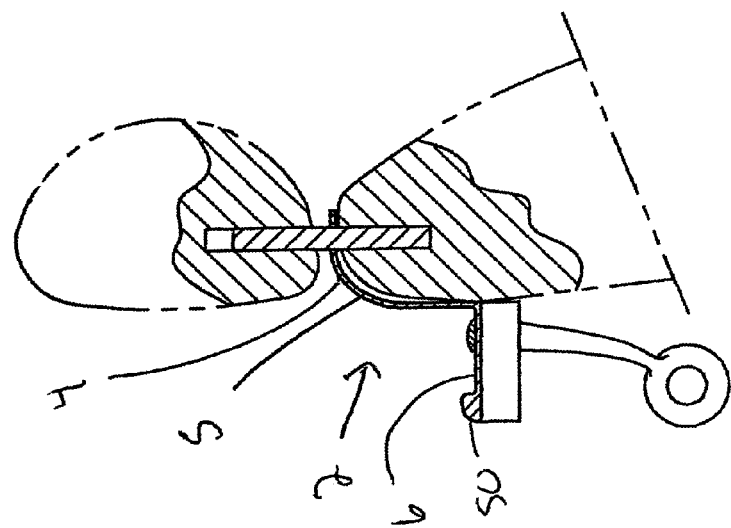
FIG. 5 shows a side view of the second embodiment of the present invention.

FIG. 3 shows a perspective view of the second embodiment of the present invention, while FIG. 5 shows a side view of the second embodiment of the present invention. In this embodiment, the vehicle seat 16 has a storage pocket 24 with an open top edge 26 mounted on the rear side of the vehicle seat 16.

Furthermore, the bend 5 in the first piece equals one hundred eighty degrees, which essentially forms a little notch within the first piece that allows the first piece to clip on to the open top edge 26.

The listening device holder 2 can also include various other items as well, such as use of a small clip for further securing a pair of headphones to the listening device holder 2. In addition, foam padding or other non-slip padding could be used on the second side of the second piece to prevent the listening 8 device, once placed against the second side of the second piece, from sliding or moving. In addition, various logos could be placed on the listening device holder 2 as a marketing technique for various companies.

I claim:

1. An apparatus for securely mounting a listening device within a vehicle, the apparatus comprising:
   (a) a first piece having two ends, a first end and a second end, the first piece also having two sides, a first side and a second side,
   (b) an angular bend located on the first piece about halfway between the first end and the second end of the first piece,
   (c) a second piece having two ends, a first end and a second end, the second piece also having two sides, a first side and a second side, the second piece also having two edges, a front edge and a rear edge, the second piece having a semi-circular shape, the first side of the second piece being concave in nature, the second side of the second piece being convex in nature, wherein the second end of the first piece is attached to the second piece about halfway in between the first end of the second piece and the second end of the second piece,
   (d) a raised lip attached to the second side of the second piece near the front edge of the second piece,
   (e) means for mounting the apparatus within a vehicle,
   (f) wherein a listening device is a pair of headphones,
   (g) further wherein the listening device is placed over the second side of the second piece.

2. An apparatus for securely mounting a listening device within a vehicle according to claim 1 wherein the angular bend is angled at approximately sixty (60) degrees.

3. An apparatus for securely mounting a listening device according to claim 2 wherein the means for mounting the apparatus within a vehicle further comprises
   (a) a vehicle seat, the vehicle seat having two sides, a front side and a rear side, the vehicle seat also having a top end,
   (b) pair of posts attached to the top end of the vehicle seat, each of the posts being vertically mounted,
   (c) a hole located on the first end of the first piece, wherein the hole is placed over one of the posts of the pair of posts,
   (d) a headrest insertably attached onto the posts after the first piece has been attached to one of the posts,
   (e) wherein the first piece and the second piece are designed to hang over on the rear side of the vehicle seat.

4. An apparatus for securely mounting a listening device according to claim 3 wherein the means for mounting the apparatus within a vehicle further comprises:
   (a) a vehicle seat, the vehicle seat having two sides, a front side and a rear side, the vehicle seat also having a top end, (b) a pair of posts attached to the top end of the vehicle seat, each of the posts being vertically mounted,
(c) a headrest insertably attached onto the posts,
(d) a storage pocket mounted on the rear side of the vehicle seat, the storage pocket including an open top edge,
(e) wherein the angular bend can be clipped over the open top edge of the storage pocket, and
(f) further wherein the first piece and the second piece are designed to hang over on the rear side of the vehicle seat.

* * * * *